United States Patent [19]

Owen

[11] Patent Number: 4,868,481
[45] Date of Patent: Sep. 19, 1989

[54] APPARATUS AND METHOD FOR BALANCING ELECTRICAL CURRENTS IN A MULTIPLE-PHASE SYSTEM

[75] Inventor: Donald W. Owen, Mustang, Okla.

[73] Assignee: Southwest Electric Company, Oklahoma City, Okla.

[21] Appl. No.: 184,113

[22] Filed: Apr. 20, 1988

[51] Int. Cl.$^4$ ............................................. C05F 1/335
[52] U.S. Cl. ................................ 323/253; 323/336; 323/338; 307/14
[58] Field of Search ............... 323/329, 335, 336, 338, 323/249, 253, 254, 305, 307, 218, 910; 363/64; 307/14

[56] References Cited

U.S. PATENT DOCUMENTS

| | | | |
|---|---|---|---|
| 2,700,130 | 1/1955 | Geyger | 323/253 |
| 2,767,372 | 10/1956 | Rowley et al. | 323/336 |
| 2,798,196 | 7/1957 | Hage | 323/254 |
| 2,808,519 | 10/1957 | Rau | 307/14 |
| 2,831,159 | 4/1958 | Guth | 323/336 |
| 2,860,257 | 11/1958 | Tellmann | 307/14 |
| 2,870,417 | 1/1959 | Rowley | 323/336 |
| 2,923,877 | 2/1960 | McKenney | 323/336 |
| 3,022,426 | 2/1962 | Kusko | 307/14 |
| 3,045,126 | 7/1962 | Morgan et al. | 307/14 |
| 3,051,889 | 8/1962 | Selin | 323/335 |
| 3,075,139 | 1/1963 | Balteau | 323/249 |
| 3,171,967 | 3/1965 | Schaefer | 307/14 |
| 3,193,605 | 7/1966 | Dreyfus | 373/104 |
| 3,292,076 | 12/1966 | Wickenhagen | 323/254 |
| 3,475,678 | 10/1969 | Herman et al. | 323/253 X |
| 3,676,766 | 7/1972 | Blackmond | 323/239 |
| 3,938,030 | 2/1976 | Cornwell | 323/253 |
| 3,991,359 | 11/1976 | Thompson et al. | 323/241 |
| 4,352,026 | 9/1982 | Owen | 307/14 |
| 4,574,231 | 3/1986 | Owen | 323/253 |

FOREIGN PATENT DOCUMENTS 596123 4/1934 Fed. Rep. of Germany .
0892488 12/1981 U.S.S.R. .............................. 323/338

OTHER PUBLICATIONS

"Negative Sequence Compensator", publication by ESCO Manufacturing Company, 7/10/76.

Primary Examiner—Patrick R. Salce
Assistant Examiner—Kristine Peckman
Attorney, Agent, or Firm—Laney, Dougherty, Hessin & Beavers

[57] ABSTRACT

A current balancer for balancing one or more currents provided from a three-phase source to a load includes three current transformer/full-wave rectifier bridge sections and one or more saturable core reactors. Each of the current transformer/full-wave rectifier bridge sections is to be connected to a respective one of the phase lines, and a saturable core reactor is to be connected into each phase line whose current is to be controlled. The outputs of all three current transformer/full-wave rectifier bridge sections are connected in electrical parallel to provide a single direct current control current to the saturable core reactor(s).

21 Claims, 4 Drawing Sheets

APPARATUS AND METHOD FOR BALANCING ELECTRICAL CURRENTS IN A MULTIPLE-PHASE SYSTEM

BACKGROUND OF THE INVENTION

This invention relates generally to apparatus and methods for balancing electrical currents in a multiple-phase electrical system. The invention relates more particularly, but not by way of limitation, to an apparatus and a method for balancing any of the phase currents in a three-phase electrical system in response to a direct current which is proportional to the average of the three alternating phase currents.

In a three-phase electrical power system, for example, to which a three-phase motor is connected for energization, many problems can arise which degrade the system and the operation and life of the motor. For example, when the motor is started, significant electrical and mechanical stresses are imposed on the motor because of the high starting currents normally used to start the motor. For example, there are electric submersible motors which have a starting current of six to eight times the nominal rating. Such high starting currents cause the system voltage to sag and thereby affect not only the motor, but also other electronic circuits on the system.

Even after a motor is started, significant stresses can be applied to the motor due to unbalanced operating currents. These unbalanced currents can cause excessive heating and increased power consumption. Also during operation, electrical transients can occur in the system, such as from lightning or switching surges. These undesirable operating conditions adversely affect not only the electrical load, but also the overall system.

The foregoing illustrates the need for an apparatus which eliminates or reduces electrical system current imbalances. There is also the need for an apparatus to eliminate or reduce electrical transients. There is the further need for an apparatus which allows the soft-starting of electrical loads, such as motors, to reduce excessive stresses imposed upon such loads during start-up. If these needs were met, the operating life and dependability of electrical loads could be increased and power consumption could be reduced.

An apparatus which meets such needs should be electrically and mechanically dependable and efficient to enhance the structural, operational and economic features of such an apparatus. Such an apparatus should also be capable of being installed and removed from the power system without causing expensive downtime of the system. Such an apparatus should also be capable of use without additional step-up transformers and with a minimum of special training for installation and maintenance.

Although the aforementioned needs can be met by my earlier invention disclosed in U.S. Pat. No. 4,574,231, there is the further need for an improved current balancing apparatus and method which utilize only one control current regardless of the number of phases of alternating current to be controlled because this would make the control circuit relatively simple and inexpensive to manufacture. There is the still further need for the control current to be a direct current which has a percent ripple substantially lower than other direct current control currents derived from less than all of the phases within the multiple-phase system because having a relatively lower percent ripple would produce lower power losses and permit the use of at least some relatively smaller, less expensive components.

SUMMARY OF THE INVENTION

The present invention meets the aforementioned needs by providing a novel and improved apparatus and method for balancing electrical currents in a multiple-phase electrical system. In addition to meeting the needs which can be met by my previous invention disclosed in U.S. Pat. No. 4,574,231, the present invention utilizes only one control current, which control current is a direct current having a relatively small percent ripple. By using only one control current regardless of the number of alternating current phases to be controlled, the present invention provides a circuit which is relatively simple and inexpensive to manufacture. Having a direct current control current with substantially lower percent ripple makes the power loss in the present invention relatively lower and also permits smaller, less expensive components to be used. Specifically for the preferred embodiment which utilizes current transformers and saturable core reactors having parallel-connected gate windings which carry the phase currents, the substantially lower percent ripple direct current control current makes the $I^2R$ power loss in the gate windings lower because the parallel-connected gate windings must carry a circulating current proportional to the ripple components of the control current as well as the alternating current phase or line current. Also, the smoother (lower ripple) direct current control current allows the current transformers to be smaller because the control winding load (voltamperes) is lower than it would be with higher ripple.

The apparatus of the present invention for balancing current to a load in an electrical system which provides multiple phases of alternating current comprises: control current means, responsive to all the multiple phases of alternating current, for providing a single control current proportional to an average of all the multiple phases of alternating current; and variable impedance means, connected to the control current means, for providing a current conductive path for a phase of alternating current, the current conductive path having an impedance automatically variable in response to the single control current so that a phase of alternating current flowing along the current conductive path is balanced relative to the remaining phases of alternating current in response to the variable impedance.

An additional feature of the present invention is a variable resistance electrically connected to three parallel-connected rectifier means in electrical parallel therewith, which rectifier means and variable resistance are included within the control current means. Another feature of the present invention includes capacitance means, electrically connected between the variable impedance means and electrical ground, for providing capacitance in combination with an inductance provided by the control current means and the variable impedance means to define filter means for impeding high frequencies of current and voltage. Still another feature includes transient suppressor means for electrically grounding high voltage transients above a predetermined voltage threshold, which transient suppressor means is electrically connected between the capacitance means and electrical ground. Another feature of the present invention is resistance means, electrically connected between the variable impedance means and electrical ground, for discharging to electrical ground direct current voltage between any phase and ground and between phases. A still further feature is that the variable impedance means operates in a saturation mode in response to the control current being at at least a predetermined ratio to the controlled phase current and the control means has means for preventing the control current from being at at least the predetermined ratio to the controlled phase current when the controlled phase current is at a predetermined value.

The present invention also provides a method of energizing a motor with balanced currents from a three-phase current source, which motor is connected to three phase lines of the current source. The method comprises the steps of: generating a first direct current in response to a first phase current from the current source; generating a second direct current in response to a second phase current from the current source; generating a third direct current in response to a third phase current from the current source; combining the first, second and third direct currents into a single control current; and controlling each of an impedance in a first phase line of the current source, an impedance in a second phase line of the current source and an impedance in a third phase line of the current source in response to the single control current so that the first, second and third phase currents of the first, second and third phase lines are balanced in response to the single control current.

In a preferred embodiment, each step of generating includes limiting the respective direct current to a predetermined maximum in response to the respective phase current exceeding a predetermined threshold magnitude; and the step of controlling includes changing, in response to limiting the direct currents, the impedance of the first phase line, the impedance of the second phase line and the impedance of the third phase line so that a phase voltage of each of the first, second and third phase lines is reduced; and which preferred embodiment method further comprises starting the motor with phase currents exceeding the predetermined threshold magnitude to apply reduced phase voltages to the motor in response to the step of changing the impedances of the phase lines so that a phase voltage-responsive starting torque of the motor is reduced and the motor is soft-started.

Therefore, from the foregoing, it is a general object of the present invention to provide a novel and improved apparatus and a novel and improved method for balancing electrical currents in a multiple-phase electrical system. Other and further objects, features and advantages of the present invention will be readily apparent to those skilled in the art when the following description of the preferred embodiments is read in conjunction with the accompanying drawings.

DETAILED DESCRIPTION OF THE PREFERRED EMBODIMENTS

Figure 1:
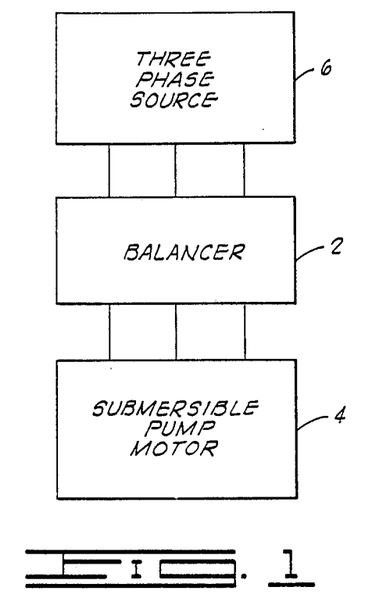
FIG. 1 is a block diagram illustrating the balancer apparatus of the present invention interconnected between a three-phase electrical power source and a load specifically identified as a motor.

As represented in FIG. 1, the present invention provides a current balancer 2 for balancing one or more alternating phase currents to a three-phase induction motor 4. The alternating phase currents which are balanced are provided from a conventional three-phase electrical system or source 6.

Although FIG. 1 illustrates the present invention with respect to a three-phase induction motor, such as a submersible pump motor, the current balancer 2 can be used for other three-phase applications where balanced currents are desirable even though the three phase voltages are not balanced or the load impedance is not balanced. Furthermore, the present invention has utility in a multiple-phase system; however, the present invention will be described in its preferred embodiments with reference to a three-phase system which is used to energize a three-phase induction motor.

With respect to a three-phase system, the principle of operation of the present invention is to connect in one or more of the three phase lines, between the source 6 and the motor 4, a respective automatically variable impedance through which the respective phase current must flow. In the preferred embodiments, each automatically variable impedance includes a conventional saturable iron core reactor. The impedance of each saturable core reactor is controlled by a direct current which is proportional to the average of the three alternating currents flowing from the source 6 to the motor 4. The term "direct current" as used herein generally means a current which can have alternating current components, but which has a net average value other than zero. More specifically, however, the "direct current" control current of the subsequently described preferred embodiments is the current derived from the sum of the rectified currents from three full-wave rectifiers fed by three current transformers, each of which is disposed in a respective one of the three phase lines. These features of the present invention will be more fully described with reference to FIGS. 2-4, and additional features by which the basic preferred embodiments shown in FIGS. 2-4 can be modified will then be described with reference to FIGS. 5-8.

Figure 2:
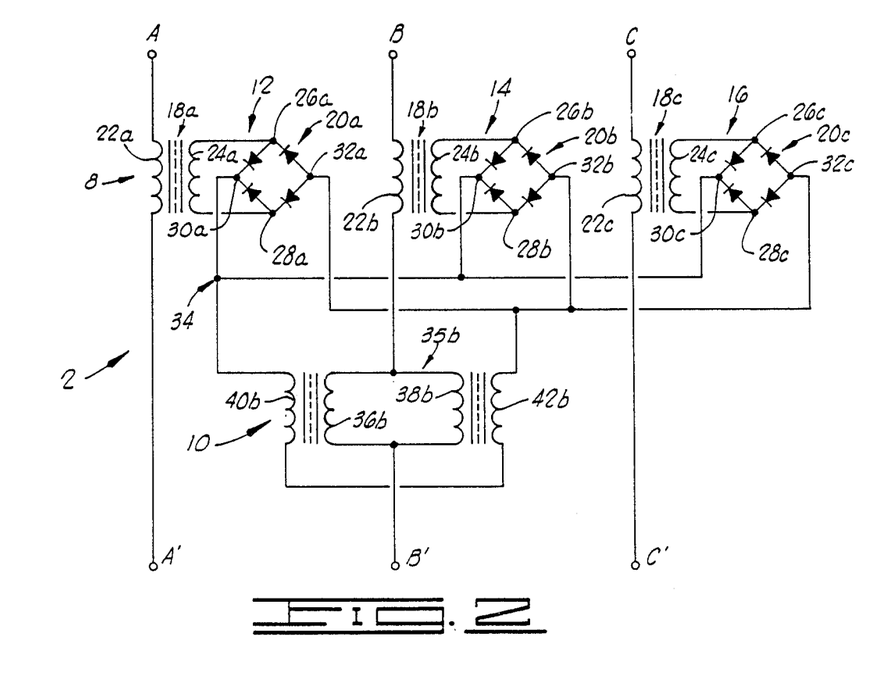
FIG. 2 is a schematic circuit diagram of a preferred embodiment of the present invention adapted for use with a three-phase electrical system, which preferred embodiment provides a single control current derived from all three phase currents to control the current of one of the three phases.

As in each preferred embodiment described herein, the preferred embodiment shown in FIG. 2 includes control current means 8, responsive to all the multiple phases of alternating current, for providing a single control current proportional to an average of all the multiple phases of alternating current. The FIG. 2 embodiment also includes variable impedance means 10, connected to the control current means 8, for providing a current conductive path for a phase of alternating current, which current conductive path has an impedance automatically variable in response to the single control current so that a phase of alternating current flowing along the current conductive path is balanced relative to the remaining phases of alternating current in response to the variable impedance. For the embodiment shown in FIG. 2, the control current means is connected to each of three phase lines or conductors, designated A—A', B—B' and C—C', of a three-phase electrical system. The variable impedance means 10 is connected into the phase line B—B'.

The control current means 8 includes three control or converter sections 12, 14, 16, each of which is connected to a respective one of the three phase lines. Because each of the sections 12, 14, 16 are identical, only the section 12 will be described in detail with the like components of the sections 14, 16 being designated by like reference numerals but followed by the lower case letter corresponding to the respective alphabetical designations of the respective phase line into which it is connected as shown in FIG. 2.

The control section 12 converts the phase of alternating current flowing in the phase line A—A' into a direct current. This is done by means of a current transformer 18a and a full-wave rectifier bridge 20a.

The current transformer 18a includes a primary winding 22a which has means for connecting it in electrical series into the phase line A—A' so that the alternating current conducted through to the phase line A—A' flows through the primary winding 22a when the current transformer 18a is connected as shown in FIG. 2. The current transformer 18a also includes a secondary winding 24a inductively coupled to the primary winding 22a. The winding 24a has terminals connected to input junctions 26a, 28a of the full-wave rectifier bridge 20a.

The full-wave rectifier bridge 20a also includes output junctions 30a, 32a. The outputs 30a, 32a are electrically connected in electrical parallel to the corresponding outputs of the full-wave rectifier bridges 20b, 20c of the sections 14, 16, respectively, as indicated by the schematically illustrated electrical connection 34.

The current transformer 18a transforms the phase current flowing in phase line A—A' into a proportional alternating current induced in the secondary winding 24a. This induced alternating current is rectified by the full-wave rectifier bridge 20a into a rectified direct current. This direct current is provided through the output junctions 30a, 32a and defines a component of the single control current provided by the control current means 8 of the present invention. The remaining components of the single control current are provided by the other control sections defining the remainder of the control current means 8, which other sections for the preferred embodiment shown in FIG. 2 include the sections 14, 16. The respective control current components provided at the respective outputs of the respective full-wave rectifier bridges are combined into the single control current by parallel connecting the outputs of the full-wave rectifier bridges as designated by the parallel connection 34. Thus, through the parallel connection 34, each of the separately generated direct current components is provided in combination with the others to the variable impedance means 10.

The variable impedance means 10 includes in the preferred embodiment a saturable core reactor 35b which includes two gate winding sections 36b, 38b. As shown in FIG. 2, the gate winding sections 36b, 38b are connected in electrical parallel and include means for connecting with the phase line B—B'; however, it is contemplated that the two gate winding sections can be connected in electrical series, but in either event it is preferred to use two gate winding sections wound in a known manner to cancel any alternating current induced from the phase line back into the control circuit. The gate winding sections 36b, 38b are electrically connected in electrical series with the phase line B—B' so that the gate winding sections 36b, 38b provide within the saturable core reactor 35b a conductive path for the phase current. This current conductive path has an impedance which is variable in response to the control signal flowing through control winding sections 40b, 42b of the saturable core reactor 35. This variable impedance is a known characteristic of a saturable core reactor.

The control winding sections 40b, 42b are inductively connected to the gate winding sections 36b, 38b, respectively. The control winding sections 40b, 42b are electrically connected in electrical series and are electrically connected to the parallel-connected outputs of the full-wave rectifier bridges 20a, 20b, 20c so that the single control current comprising the three direct current components output from the rectifier bridges flows through the serially connected control winding sections 40b, 42b. Thus, the single control current, comprising three combined but separately rectified direct current components, flows through the single conductive path which includes the serially connected control winding sections 40b, 42b.

For the preferred embodiment shown in FIG. 2, only the phase current flowing in the phase line B—B' is controlled. The current in this phase line is held at the average of the three phase currents in response to the single control current defined by the direct current components created by each of the current transformer/full-wave rectifier bridge circuits of the sections 12, 14, 16. This type of single phase current control is useful in cases wherein the uncompensated current in phase line B—B' would be higher than the phase currents in lines A—A' and C—C' and where the phase currents of these other two lines are equal. Open delta transformers cause this condition. Also long, flat three-conductor motor cables used with submersible pumps cause this condition.

Figure 3:
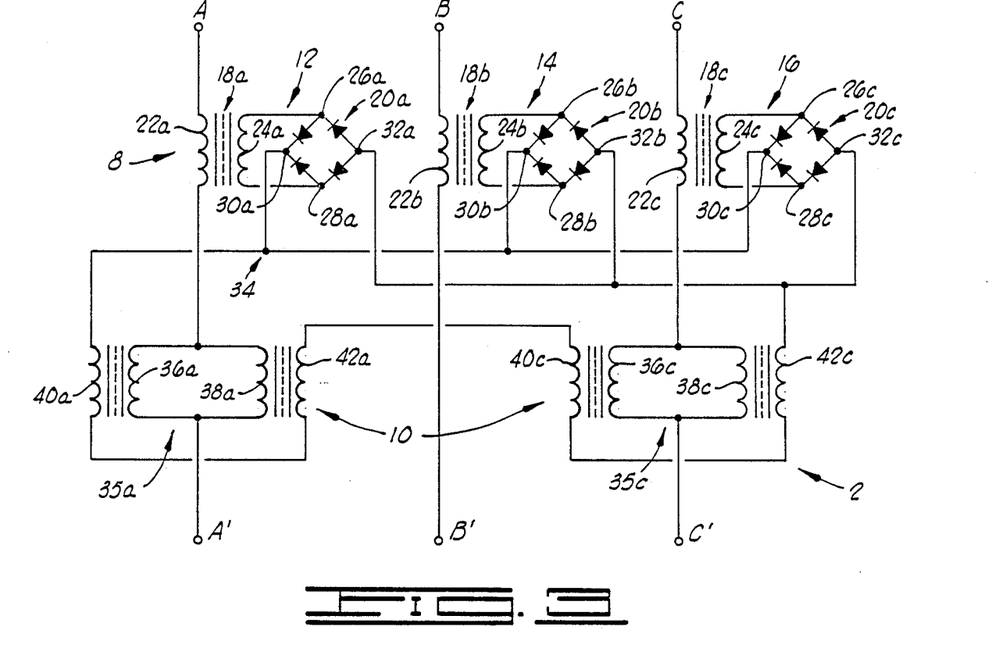
FIG. 3 is a schematic circuit diagram of another preferred embodiment of the present invention, similar to the one shown in FIG. 2, but adapted for controlling two of the three phase currents.

Another preferred embodiment of the present invention is shown in FIG. 3. The apparatus shown in FIG. 3 includes the same control current means 8 as in the previously described embodiment, but the FIG. 3 embodiment includes two sections of the variable impedance means 10. One of the sections of variable impedance means 10 is connected into the phase line A—A' and the other section is connected into the phase line C—C' for the circuit illustrated in FIG. 3. Because the components of the control current means and the variable impedance means illustrated in FIG. 3 are the same as these described hereinabove with reference to the FIG. 2 embodiment, no further description thereof is made other than to indicate that the like components are designated by like reference numerals followed by the respective lower case alphabetic designation corresponding to the respective phase line into which it is connected as shown in FIG. 3.

In the FIG. 3 embodiment, the two phase currents of the phase lines A—A' and C—C' flow through the saturable core reactors 35a, 35c, respectively. These two phase currents are held at the average of the three phase currents in response to the single control current provided by the control current means 8 in the same manner as described hereinabove with reference to FIG. 2. This single control current flows through the serially connected control winding sections 40a, 42a, 40c, 42c of the saturable core reactors 35a, 35c. The embodiment illustrated in FIG. 3 is useful where for any reason the current in the phase line B—B', when uncompensated, is lower than either the phase current of line A—A' or the phase current of line C—C'.

Figure 4:
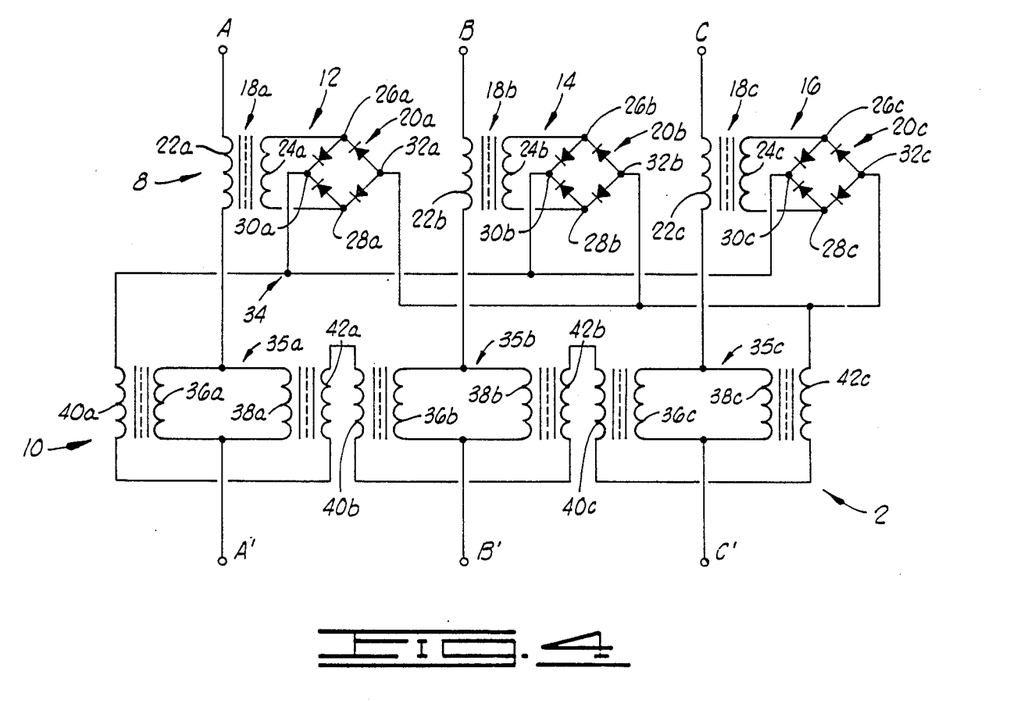
FIG. 4 is a schematic circuit diagram of still another preferred embodiment of the present invention, which preferred embodiment is similar to the preceding two but this one controlling all three phase currents.

Still another preferred embodiment of the present invention is shown in FIG. 4. This embodiment includes variable impedance means 10 in all of the phase lines. As indicated by the like reference numerals, the components of each of the sections shown in FIG. 4 are the same as corresponding ones shown in FIGS. 2 and 3. The control winding sections 40a, 42a, 40b, 42b, 40c, 42c of the saturable core reactors 35a, 35b, 35c are electrically connected in electrical series, which series of windings is connected across the parallel-connected full-wave rectifier bridges 20a, 20b, 20c of the three control sections 12, 14, 16 of the control current means 8. Thus, in the FIG. 4 embodiment, all three phase currents flow through saturable core reactors which are controlled by the single control current provided by the parallel-connected full-wave rectifier bridges so that the phase current in each phase line is held at the average of the three phase currents.

Figure 5:
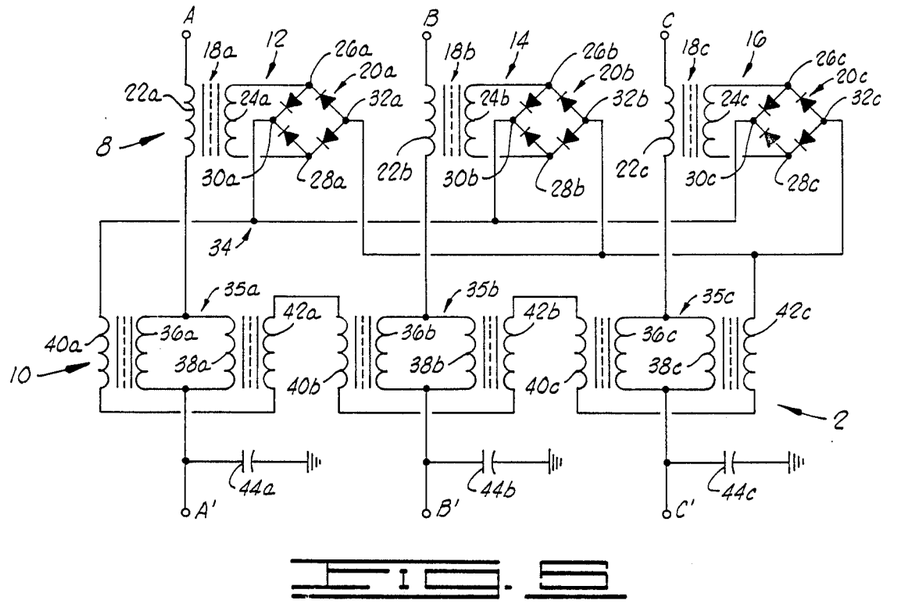
FIG. 5 is a schematic circuit diagram of the preferred embodiment shown in FIG. 4, but modified to include a respective capacitor connected between each phase line and electrical ground.

With reference to FIG. 5, a modification of the embodiment shown in FIG. 4 will be described. Inherently created by the connection of the control current means 8 and the variable impedance means 10 into the three phase electrical system is an inductance. By combining a capacitance with this inductance, an inductive-capacitive (L-C) filter can be provided to filter high frequencies. Such a filter is constructed in the FIG. 5 embodiment wherein each of three capacitors 44a, 44b, 44c is connected between a respective one of the phase lines and an electrical ground of the electrical system. The use of L-C filters in electrical systems to impede or filter high frequencies is well known; however, in the present invention such filtering is obtained simply by adding capacitors in combination with the inherent inductance provided by the current transformers and saturable core reactors used in the preferred embodiments of the present invention described hereinabove.

Figure 6:
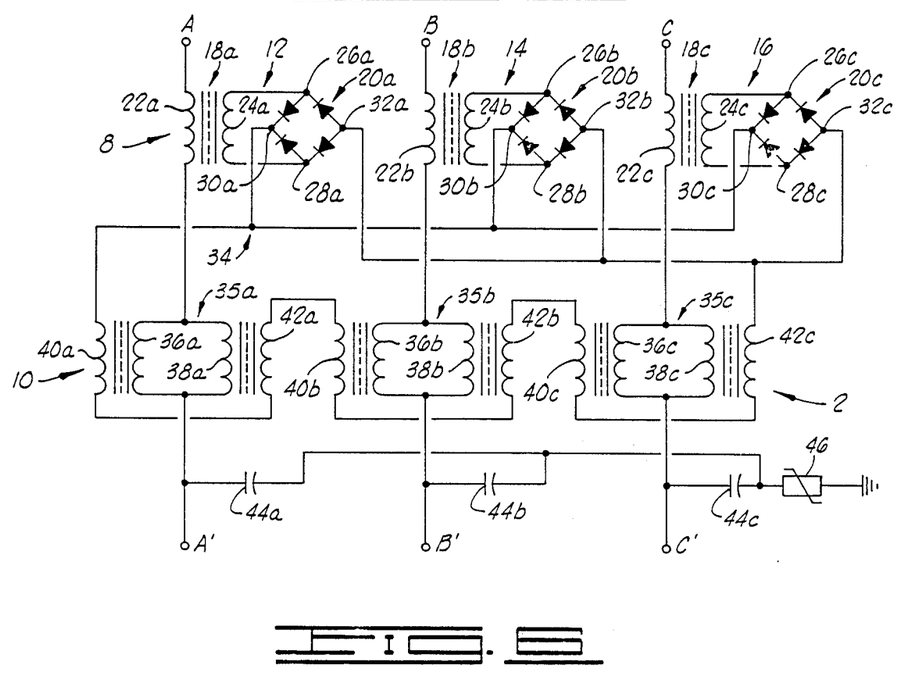
FIG. 6 is a schematic circuit diagram of the preferred embodiment shown in FIG. 4, but modified to include capacitors connected from each phase line to a transient suppressor connected to electrical ground.

A different modification, but one similar to the modification shown in FIG. 5, is illustrated in FIG. 6. In the FIG. 6 embodiment, the capacitors 44a, 44b, 44c are used; however, each has an end connected in common to a transient suppressor means 46 for electrically grounding high voltage transients above a voltage threshold which is predetermined by the nature of the means 46. As shown in FIG. 6, the transient suppressor means 46 is connected between the commonly connected ends of the capacitors 44a, 44b, 44c and electrical ground. An example of a suitable embodiment of the transient suppressor means 46 is a metal oxide varistor of a type as known to the art. This type of device has been known to be connected directly between a phase line and electrical ground to provide the aforementioned transient suppression for protecting against overvoltage conditions such as can occur when lightning strikes the system, for example.

Figure 7:
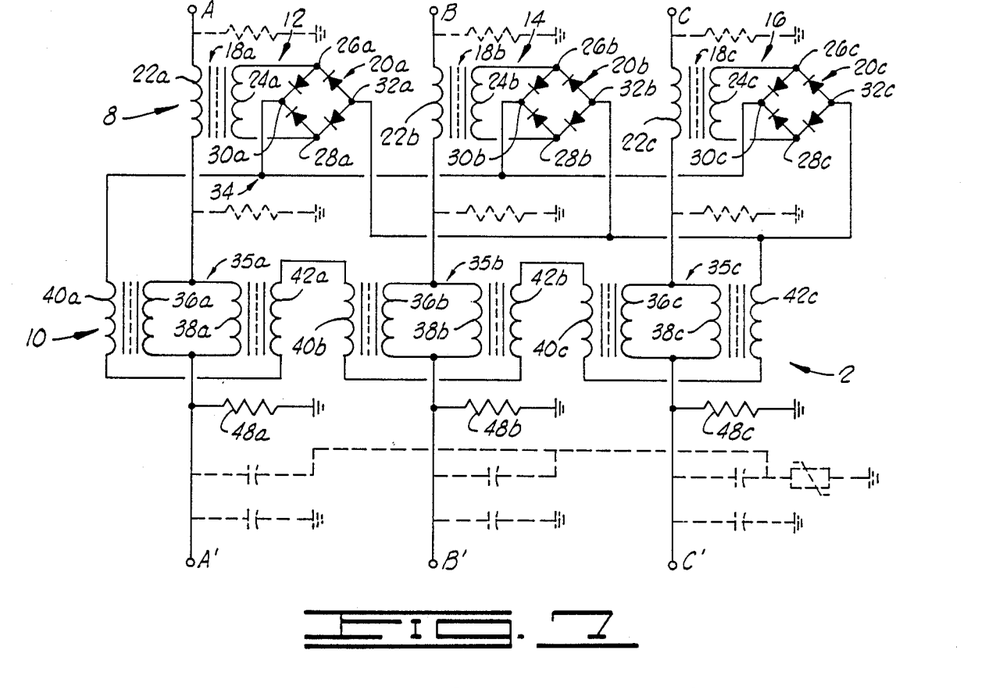
FIG. 7 is a schematic circuit diagram of the preferred embodiment shown in FIG. 4, but modified to include a respective resistor connected between each phase line and electrical ground.

Whereas the modifications illustrated in FIGS. 5 and 6 are useful in impeding unwanted alternating current and transient currents and voltages, the modification illustrated in FIG. 7 discharges direct current potentials that exist between the load circuit and electrical ground and between the phase lines. This is accomplished by connecting resistors 48a, 48b, 48c between respective phase lin0650 es and electrical ground. As indicated by the dash-line drawings in FIG. 7, the resistors can be placed anywhere along the system and can be combined with the modifications illustrated in FIGS. 5 and 6.

It is to be noted that any of the foregoing modifications can be used with the other preferred embodiments shown in FIGS. 1 and 2.

Figure 8:
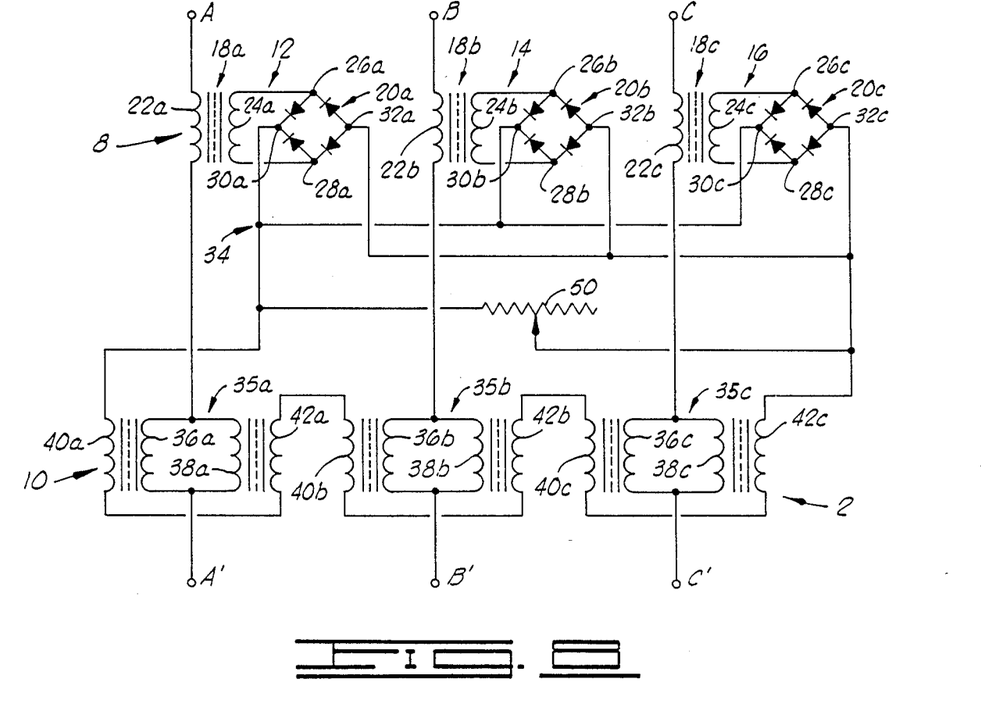
FIG. 8 is a schematic circuit diagram of the embodiment shown in FIG. 4, but modified to include a variable resistor connected in electrical parallel with the full-wave rectifier bridges.

Another modification which can be used with any of the other preferred embodiments is shown in FIG. 8. This modification includes a variable resistance 50 electrically connected in electrical parallel with the parallel-connected full-wave rectifier bridges 20a, 20b, 20c and with the series-connected control windings 40a, 42a, 40b, 42b, 40c, 42c of the variable impedance means. The variable resistance 50 is adjusted to compensate for variations in the characteristics of either the current transformers of the control current means 8 or the saturable core reactor(s) of the variable impedance means.

The components of the foregoing preferred embodiments are of conventional types and can be selected as to specific electrical characteristics as desired. However, with respect to the current transformers 18 and the saturable core reactors 35, a specific embodiment of the present invention contemplates selecting these to have characteristics by which the three-phase induction motor 4 of the exemplary environment illustrated in FIG. 1 can be softstarted. In general, each saturable core reactor 35 is selected so that it operates in a saturation mode in response to the control current being at at least a predetermined ratio to the respective phase current flowing through the saturable core reactor, which selection is made in combination with a selection of the current transformers which are designed to prevent the control current from being at at least such predetermined ratio to the phase currents when the phase currents are at a predetermined value. By way of a specific example, current transformers can be selected to keep the saturable core reactor saturated up to approximately 150% of rated current of the balancer device 2. For any current above this rated current, the respective current transformer can no longer hold a constant ratio between its secondary voltage and the respective phase current because the control voltage required is above the burden rating of the current transformer. For such a high phase current, the saturable core reactor is not kept in saturation. This causes the three-phase voltage supplied to the motor 4 to sag approximately 15%, thereby sagging the motor torque approximately 30%. Thus, by appropriately selecting the current transformers and the saturable core reactors, a voltage sag and correspondingly a starting torque sag can be imposed at the high starting currents which are drawn when starting the motor 4.

Again referring to the exemplary environment illustrated in FIG. 1, the preferred embodiment of the method of the present invention will be described. This method is particularly adapted for energizing the motor 4 with balanced current from the three-phase current source 6. This method comprises generating respective direct currents in response to each of the three phase currents flowing from the current source 6 to the motor 4. These three direct currents are combined into a single control current, which control current controls each of the variable impedances in the three phase lines so that the three phase currents of the three phase lines are balanced in response to the single control current. Utilizing the foregoing method to soft-start the motor 4 further includes: limiting the respective direct current of a phase to a predetermined maximum in response to the respective phase current exceeding a predetermined threshold magnitude; and changing, in response to limiting the direct currents, the impedances of the three phase lines so that a phase voltage of each of the three phase lines is reduced; and starting the motor with phase currents exceeding the predetermined threshold magnitude to apply reduced phase voltages to the motor in response to the step of changing the impedances of the phase line so that a phase voltage-responsive starting torque of the motor is reduced and the motor is soft-started.

From the foregoing, it is apparent that phase current balancing of one or more phase currents is accomplished with the present invention by using only a single control current regardless of the number of phase currents to be controlled. The direct current components making up the single control current are derived in the same manner from each phase so that identical electric components can be used with each phase line. This makes the control circuit simple and inexpensive to manufacture. Additionally, creating the single control current from a combination of rectified direct currents from all of the available phase lines creates a control current with ripple which is substantially lower than if the control current were derived from less than all of the phases. For example, it is believed that a single phase rectified control current might have about 70-80 percent ripple, whereas it is believed that the three-phase control current of the preferred embodiments of the present invention might have only about 15 percent ripple. This makes the $I^2R$ power loss in the gate windings of the saturable core reactors relatively lower because the gate windings must carry a circulating current proportional to the ripple component of the control current as well as the phase current. Also, a smoother direct current control current allows the current transformers to be smaller because the control winding load is lower than it would be with higher ripple.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. An apparatus for balancing current to a load in an electrical system which provides multiple phases of alternating current, said apparatus comprising:

control current means, responsive to multiple phases of alternating current of an electrical system, for providing a single control current proportional to an average of all the multiple phases of alternating current; and variable impedance means, connected to said control current means, for providing a current conductive path for a phase of alternating current, said current conductive path having an impedance automatically variable in response to said single control current so that a phase of alternating current flowing along said current conductive path is balanced relative to the remaining phases of alternating current in response to the variable impedance.

2. An apparatus as defined in claim 1, wherein:

said control current means includes:

first current transformer means, including means for electrically connecting to the electrical system to receive a first phase of alternating current thereof, for providing an alternating current which is proportional to said first phase of alternating current;

first rectifier means, electrically connected to said first current transformer means, for rectifying said alternating current which is proportional to said first phase of alternating current so that a first control current component is defined;

second current transformer means, including means for electrically connecting to the electrical system to receive a second phase of alternating current thereof, for providing an alternating current which is proportional to said second phase of alternating current;

second rectifier means, electrically connected to said second current transformer means, for rectifying said alternating current which is proportional to said second phase of alternating current so that a second control current component is defined;

third current transformer means, including means for electrically connecting to the electrical system to receive a third phase of alternating current thereof, for providing an alternating current which is proportional to said third phase of alternating current;

third rectifier means, electrically connected to said third current transformer means, for rectifying said alternating current which is proportional to said third phase of alternating current so that a third control current component is defined; and wherein said first, second and third rectifier means are electrically connected together in electrical parallel so that said first, second and third control current components are combined to define said single control current; and said variable impedance means includes a saturable core reactor comprising:

gate winding means for receiving one of said first, second and third phases of alternating current; and control winding means, inductively coupled to said gate winding means and electrically connected to said parallel-connected first, second and third rectifier means, for receiving said single control current.

3. An apparatus as defined in claim 2, wherein said control current means further includes a variable resistance electrically connected to said parallel-connected first, second and third rectifier means in electrical parallel therewith.

4. An apparatus as defined in claim 1, further comprising a three-phase induction motor electrically connected to said variable impedance means.

5. An apparatus as defined in claim 4, wherein said three-phase induction motor includes a submersible pump motor.

6. An apparatus as defined in claim 1, wherein:
said control current means and said variable impedance means have inductance; and
said apparatus further comprises capacitance means, electrically connected between said variable impedance means and electrical ground, for providing capacitance in combination with said inductance to define a filter means for impeding high frequencies of current and voltage.

7. An apparatus as defined in claim 6, further comprising transient suppressor means for electrically grounding high voltage transients above a predetermined voltage threshold, said transient suppressor means electrically connected between said capacitance means and electrical ground.

8. An apparatus as defined in claim 1, further comprising resistance means, electrically connected between said variable impedance means and electrical ground, for discharging direct current voltage between any phase and electrical ground and between any two phases.

9. An apparatus for balancing current to a load in an electrical system including first, second and third phases of alternating current, said apparatus comprising:
first converter means for converting a first phase of alternating current into a first direct current;
second converter means for converting a second phase of alternating current into a second direct current;
third converter means for converting a third phase of alternating current into a third direct current; and
variable impedance means, electrically connected to said first, second and third converter means so that said first, second and third direct currents are provided in combination to said variable impedance means as a control current, for conducting the first phase alternating current through a variable impedance responsive to said control current.

10. An apparatus as defined in claim 9, wherein:
said first converter means includes:
a first current transformer; and
a first full-wave rectifier including inputs electrically connected to said first current transformer, and outputs;
said second converter means includes:
a second current transformer; and
a second full-wave rectifier including inputs electrically connected to said second current transformer, and outputs electrically connected in electrical parallel with said outputs of said first full-wave rectifier; and
said third converter means includes:
a third current transformer; and
a third full-wave rectifier including inputs electrically connected to said third current transformer, and outputs electrically connected in electrical parallel with said parallel-connected outputs of said first and second full-wave rectifier means.

11. An apparatus as defined in claim 10, further comprising a variable resistance electrically connected to said outputs of said first, second and third full-wave rectifiers.

12. An apparatus as defined in claim 9, further comprising a three-phase induction motor electrically connected to said variable impedance means.

13. An apparatus as defined in claim 12, wherein said three-phase induction motor includes a submersible pump motor.

14. An apparatus for balancing currents in a three-phase electrical system including first, second and third phase current conductors, said apparatus comprising:
first control means, including means for connecting to a first phase current conductor, for providing a first rectified current in response to a first phase current flowing through the first phase current conductor;
second control means, including means for connecting to a second phase current conductor, for providing a second rectified current in response to a second phase current flowing through the second phase current conductor;
third control means, including means for connecting to a third phase current conductor, for providing a third rectified current in response to a third phase current flowing through the third phase current conductor;
first variable impedance means, including means for connecting to the first phase current conductor, for providing a variable impedance in electrical series with the first phase current conductor in response to a control current;
second variable impedance means, including means for connecting to the second phase current conductor, for providing a variable impedance in electrical series with the second phase current conductor in response to said control current;
third variable impedance means, including means for connecting to the third phase current conductor, for providing a variable impedance in electrical series with the third phase current conductor in response to said control current; and
said first, second and third control means electrically connected in electrical parallel across said first, second and third variable impedance means so that said first, second and third rectified currents flow through said first, second and third variable impedance means to define said control current.

15. An apparatus as defined in claim 14, wherein:
said first variable impedance means includes:
first gate winding means for conducting the first phase current; and
first control winding means, inductively coupled to said first gate winding means, for conducting said control current;
said second variable impedance means includes:
second gate winding means for conducting the second phase current; and
second control winding means, inductively coupled to said second gate winding means, for conducting said control current;
said third variable impedance means includes:
third gate winding means for conducting the third phase current; and
third control winding means, inductively coupled to said third gate winding means, for conducting said control current; and said first, second and third control winding means are electrically connected in electrical series, across which said electrical series said first, second and third control means are electrically connected in said electrical parallel.

16. An apparatus as defined in claim 14, wherein:
said first variable impedance means includes a first saturable core reactor which operates in a saturation mode in response to said control current being at at least a predetermined ratio to the first phase current;
said second variable impedance means includes a second saturable core reactor which operates in a saturation mode in response to said control current being at at least a predetermined ratio to the second phase current;
said third variable impedance means includes a third saturable core reactor which operates in a saturation mode in response to said control current being at at least a predetermined ratio to the third phase current;
said first control means includes a first current transformer electrically connected to said first saturable core reactor, said first current transformer including means for preventing said control current from being at at least said predetermined ratio to the first phase current when the first phase current is at a predetermined value;
said second control means includes a second current transformer electrically connected to said second saturable core reactor, said second current transformer including means for preventing said control current from being at at least said predetermined ratio to the second phase current when the second phase current is at a predetermined value; and
said third control means includes a third current transformer electrically connected to said third saturable core reactor, said third current transformer including means for preventing said control current from being at at least said predetermined ratio to the third phase current when the third phase current is at a predetermined value.

17. An apparatus as defined in claim 14, further comprising:
a first capacitor electrically connected between the first phase current conductor and electrical ground;
a second capacitor electrically connected between the second phase current conductor and electrical ground; and
a third capacitor electrically connected between the third phase current conductor and electrical ground.

18. An apparatus as defined in claim 14, further comprising:
a first resistor electrically connected between the first phase current conductor and electrical ground;
a second resistor electrically connected between the second phase current conductor and electrical ground; and
a third resistor electrically connected between the third phase current conductor and electrical ground.

19. An apparatus as defined in claim 14, further comprising:
transient suppressor means for electrically grounding high voltage transients above a predetermined voltage threshold;
a first capacitor electrically connected between the first phase current conductor and said transient suppressor means;
a second capacitor electrically connected between the second phase current conductor and said transient suppressor means; and
a third capacitor electrically connected between the third phase current conductor and said transient suppressor means.

20. A method of energizing a motor with balanced currents from a three-phase current source, which motor is connected to three phase lines of the current source, said method comprising the steps of:
generating a first direct current in response to a first phase current from the current source;
generating a second direct current in response to a second phase current from the current source;
generating a third direct current in response to a third phase current from the current source;
combining the first, second and third direct currents into a single control current; and
controlling each of an impedance in a first phase line of the current source, an impedance in a second phase line of the current source and an impedance in a third phase line of the current source in response to the single control current so that the first, second and third phase currents of the first, second and third phase lines are balanced in response to the single control current.

21. A method as defined in claim 20, wherein:
each step of generating includes limiting the respective direct current to a predetermined maximum in response to the respective phase current exceeding a predetermined threshold magnitude;
said step of controlling includes changing, in response to limiting the direct currents, the impedance of the first phase line, the impedance of the second phase line and the impedance of the third phase line so that a phase voltage of each of the first, second and third phase lines is reduced; and
said method further comprises starting the motor with phase currents exceeding the predetermined threshold magnitude to apply reduced phase voltages to the motor in response to said step of changing the impedances of the phase lines so that a phase voltage-responsive starting torque of the motor is reduced and the motor is soft-started.

* * * * *

UNITED STATES PATENT AND TRADEMARK OFFICE
CERTIFICATE OF CORRECTION

PATENT NO. : 4,868,481

DATED : September 19, 1989

INVENTOR(S) : Donald W. Owen

It is certified that error appears in the above-identified patent and that said Letters Patent is hereby corrected as shown below:

Column 7, line 1, change "these" to --those--.

Column 8, line 15, change "1in0650 es" to --lines--.

Signed and Sealed this

Twenty-fourth Day of July, 1990

Attest:

HARRY F. MANBECK, JR.

*Attesting Officer*  *Commissioner of Patents and Trademarks*